Sept. 6, 1955  N. E. WALKER  2,717,297
SELF CLEANING ELECTRIC SWITCH
Filed Sept. 7, 1954

INVENTOR.
Neville E. Walker
BY
Atty.

ated Sept. 6, 1955

2,717,297
SELF-CLEANING ELECTRIC SWITCH
Neville E. Walker, Portland, Oreg.
Application September 7, 1954, Serial No. 454,449
7 Claims. (Cl. 200—166)

My invention relates to a small, self-cleaning electric switch of unusual sensitivity and operating efficiency, said switch being responsive to extremely light actuating pressures selectively to make or to break an electric circuit joined in series therewith.

One object of my invention is to provide an electric switch which is accurate and rugged in operation yet which is of sufficient sensitivity to be responsive to actuation by a coil in which a very weak electric current is caused to flow. Thus, by effecting control of a much high amperage with the switch itself, an amplification or multiplication effect is obtainable.

The instant invention is related to my previous Patent No. 2,655,086 entitled Automatic Camera Light Aperture Control, in that the electric switch herein claimed is an improvement upon the electric switch disclosed in the previous patent. In said application, there is described an automatic exposure control mechanism in which a photovoltaic cell is utilized as an input or a lead element and an electric motor is utilized as an output or a follow-up element to adjust the iris diaphragm or other exposure control of a camera. By employing a proper mechanical correlation of these elements, the weak output signal of the photovoltaic cell is converted to a strong electric motor follow-up movement by which adjustment of the exposure control or iris diaphragm of the camera accurately and continuously is effected in proportion to the amount of illumination available at the scene being photographed. In essence, irradiation of the photovoltaic cell generates a potential difference whereby a weak electric current is caused to flow in a coil which is mounted for rotation between the poles of a permanent magnet. As this coil rotates, a switch blade, carried by the coil, is caused to move back and forth to mate with either one of two switch contact members. By an appropriate electric circuit, closure of the switch blade against either contact actuates a reversible electric motor simultaneously to adjust the exposure control of the camera and to follow-up and reset the switch blade. In this manner, the exposure control of the camera continuously is adjusted in proportion to the irradiation of the photovoltaic cell, the latter being proportional to the illumination of the scene being photographed. The instant invention, in substance, provides an improved switch blade and switch contact for use with such a camera control mechanism.

The conventional self-generating or photovoltaic cell is a light sensitive device which generates a potential difference when irradiated. For example, a layer of cuprous oxide on copper or selenium on iron is arranged to define an interface possessing a degree of conductivity. Electrons which are released from the interface by incident light are trapped by the barrier layer and returned through an external circuit, provided the external resistance is low compared with that of the interface. In effect, this is a process of direct transformation of light energy into electrical energy and it has found wide commercial acceptance in photographic exposure meters and the like. As to the external circuit, an exemplary structure may include a wire coil which is mounted between the poles of a permanent magnet, the coil itself being joined in series with the photovoltaic cell. When the cell is irradiated, a weak current flows through the coil to cause the latter to rotate between the poles of the magnet.

With the instant invention, I utilize the rotation of such a coil by securing a novel switch blade thereto and by mounting a contact on either side of this switch blade. As will be appreciated by those skilled in the art, the current generated by a photovoltaic cell is too weak to move such a coil against the opposition of any appreciable force. Thus, the luminous sensitivity of the typical commercial photovoltaic cell varies from 100 to 500 microamperes per lumen and the maximum or short circuit current of such a cell is approximately 500 microamperes. From this, it will be apparent that the contact force or pressure available to close the switch blade against a contact is extremely light. At the same time, however, an accurate control of the camera exposure mechanism requires that the switch function effectively and repeatedly in very rapid sequence in spite of the limited closure force which is available. In accord therewith, it is one object of my invention to provide an electric switch which is of a maximum sensitivity yet which is responsive to the extremely light operating pressures which are generated by a coil in response to the current flow from a photovoltaic cell.

To the above ends, the switch blade of my invention includes a pair of elongated thin legs which are dextrorsal and sinistrorsal respectively, and which are mounted with the axes thereof parallel. Additionally, each leg terminates in a flat, thin laterally extending conductor strip. The contact bars, with which the switch blade selectively is caused to mate, are arranged immediately adjacent the flat, thin strips but at an oblique angle thereto. Additionally, the switch blade is flexible whereas the contact bars are stiff in order that the light force or pressure which moves the blade will be effective to twist the strips toward parallelism with the bar. In effect, this twist will slide the strips along the surface of the contact bar with a scraping motion. At the same time, the legs themselves are flexible in order that the light contact pressure will bow the legs and thus draw the strips laterally across the contact bars. In this manner, dirt and oxides will be scraped and scoured from the contact bars by the strips each time the switch is closed. Similarly, the flexible nature of the switch blade will aid in effecting an opening movement of the switch and will cushion an opposite closure movement. In total, these various structural provisions yield an electric switch which ideally is suited to the rugged yet sensitive requirements of a camera control mechanism.

In accord with the above description, it is another object of my invention to provide a twisted flexible blade for an electric switch whereby closure pressure of the blade against a stiff contact bar simultaneously will slide the blade along the contact and will draw the blade across the contact. In this manner, the contact bar will be scraped and scoured to remove dirt and oxide each time the switch is closed.

A further object of my invention is to provide a dual element flexible blade for an electric switch, one element being dextrorsal and the other sinistrorsal so that simultaneous abutment of these elements with the stiff contact bar will tend to untwist both elements. Thus, the lateral forces which are generated by the untwisting of the two blade elements exactly will balance out and undue lateral strain upon the contact bars and the switch blade will be avoided.

Yet another object of my invention is to provide a switch blade which is extremely light and sensitive yet which is effective selectively to open or to close an electric switch in order that the blade may be actuated in rotation by a coil which in turn is responsive to the current caused to flow therethrough from a light sensitive photovoltaic cell.

These and other objects and advantages of my invention will become apparent in the following detailed description, taken in conjunction with the accompanying drawing, wherein.

Figure 3:
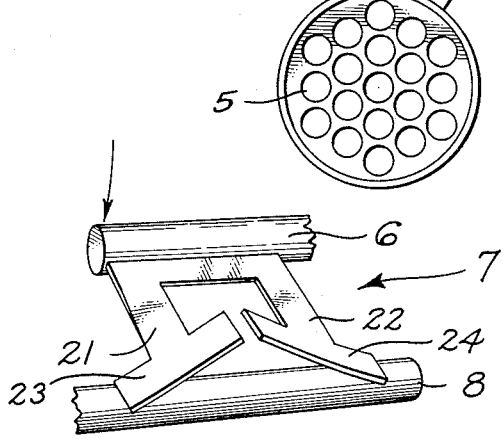
Figure 4:
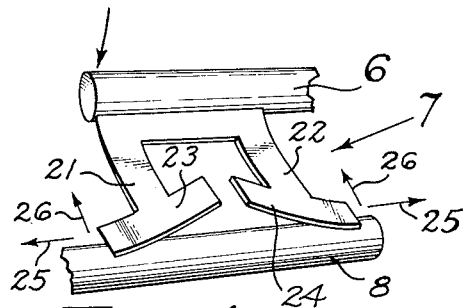

Fig. 3 is a detail view which is enlarged many times and which shows the electric switch per se at the instant initial closure contact is made between the switch blade and one of the contact bars; and Fig. 4 is a side view similar to Fig. 3 but indicating the disposition of the elements of the electric switch after contact pressure has increased and after the switch blade has been twisted, bowed and flexed by this increased contact pressure.

Figure 2:
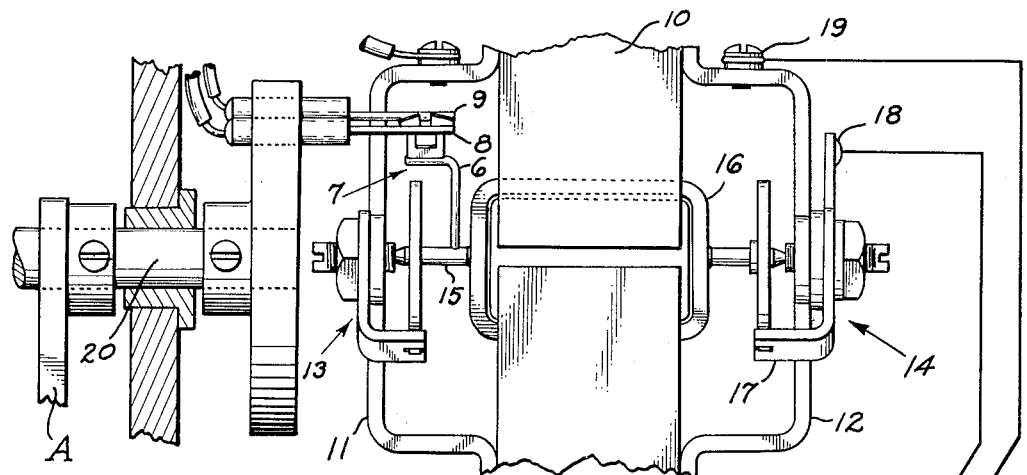
Fig. 2 is an enlarged detail view of a portion of the structure shown in Fig. 1, this view indicating the interrelationship of the rotatable coil and the permanent magnet to a light sensitive photovoltaic cell and the novel electric switch of the instant invention.
Figure 1:
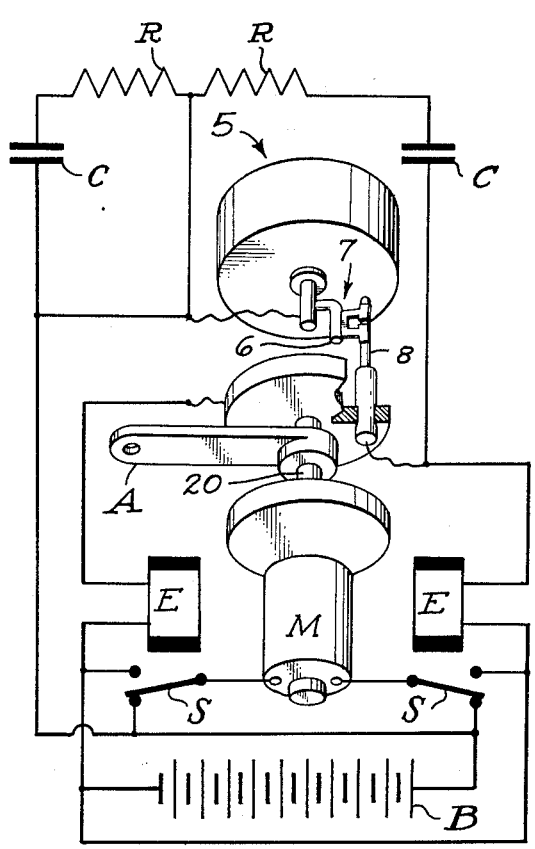
Fig. 1 is a schematic wiring diagram indicating the operational relationship of the various elements of a camera exposure control mechanism in which the electric switch of the instant invention is utilized as a vital part.

To provide a setting for the electric switch which forms the subject matter of the instant invention, I have shown an exemplary camera control mechanism in Figs. 1 and 2 of the drawings. Thus, the numeral 5 identifies a photovoltaic cell of the type previously described. In function, this cell is responsive to the light level to cause an arm 6 to rotate and to carry therewith a switch blade 7. The switch blade, in turn, mates with either of two rather stiff and unyielding switch contact bars 8 and 9.

Turning to the wiring diagram of Fig. 1, I have shown the above described elements in combination with an electric circuit. This circuit includes a battery B, two resistors R, two condensers C, a reversible direct current electric motor M, two electromagnets E operable to open or close corresponding switches S, and an arm A which may be joined to the iris diaphragm or other exposure control mechanism of a camera. In operation, the camera and photovoltaic cell 5 both are directed toward the scene which is to be photographed. In accord with the ability of the cell to generate a potential difference when irradiated, the arm 6 is rotated in one direction or the other as the level of illumination dictates. This rotation causes the switch blade 7 to mate with one of the contact bars 8 or 9 whereby an electric circuit is completed through a corresponding one of the electromagnets E. Actuation of an electromagnet closes the corresponding switch S to actuate the electric motor M. Rotation of the armature shaft 20 of the motor M, in turn, effects two simultaneous results. Firstly, the iris diaphragm of the camera is adjusted by movement of the arm A. Secondly, the contact bars 8 and 9 are moved in a direction to again center the switch blade 7 between these contacts. When the appropriate contact bar has been moved out of contact with the switch blade 7, the electric circuit is broken and the corresponding electromagnet E is de-energized to return the switch S to the position shown in Fig. 1. Thus, the exposure control of a camera accurately, continuously, and proportionally, can be adjusted in accord with the illumination of the scene being photographed.

Referring now to Fig. 2, I have shown an enlarged detail of the mechanism by which the switch blade 7 is rotated. This mechanism includes a permanent magnet 10 having two frame members 11 and 12 joined thereto but insulated therefrom. Additionally, two bearing structures 13 and 14 are mounted upon the frame members 11 and 12, respectively, and the right bearing structure 14 is insulated from the frame member 12. In function, these bearings carry a rotatable shaft 15 on which a coil 16 is mounted. As shown, the coil 16 is joined in series with the photovoltaic cell 5 by means of a conductor arm 17, a contact 18, a second contact 19, and an appropriate electrically conductive frame and shaft element. Accordingly, as more or less light falls upon the photovoltaic cell 5, a current is caused to flow in the coil 16 and, in well known manner, the field of the permanent magnet 10 coacts therewith to rotate the coil upon the two bearing structures 13 and 14. Such a rotation, in turn, causes the arm 6 and the switch blade 7 to move back and forth into or out of mated contact with one of the contact bars 8 and 9.

At the left side of Fig. 2, I have shown a portion of the structure previously described for rotating the arm A and thereby, for effecting an adjustment of a camera exposure control. As shown, this structure includes the rotatable armature shaft 20 of the reversible electric motor M. In accord with the previously described operation, rotation of this armature shaft 20 simultaneously adjusts the exposure control of a camera via the arm A and moves the two contact bars 8 and 9 to effect a follow-up motion for the electric switch mechanism. Accordingly, each time the photovoltaic cell 5 responds to a change in the level of illumination, the contact bars 8 and 9 are moved to follow-up the rotational movement of the switch blade 7 and, once more, to return this switch blade to a neutral position intermediate the two contact bars.

In Figs. 3 and 4, I have shown an enlarged or magnified view of the switch blade 7 and a single contact bar 8 in appreciation of the details of the novelty of my invention. Thus, the switch blade 7 includes a thin U-shaped sheet formed of metal having a low electrical resistance, such as platinum, and having two elongated thin legs 21 and 22 mounted with the axes thereof parallel. As shown, these legs respectively are dextrorsal and sinistrorsal and both terminate in thin laterally extending conductor strips 23 and 24. In constructing the switch blade 7, I prefer to utilize a thin sheet of platinum having a thickness of approximately $\frac{1}{10,000}$ of an inch. Thus, the blade itself is flexible and, in contrast therewith, the contact bar 8 is stiff and unyielding.

Fig. 3 illustrates the position of the parts at the instant initial contact is made between the switch blade 7 and the contact bar 8 so as to make the electric circuit through the motor M. Fig. 4, on the other hand, illustrates the position of these same parts after the photovoltaic cell 5 and coil 16 have effected full contact pressure. Thus, it will be seen that the thin strips 23 and 24 normally are arranged at an oblique angle to the elongated contact bar 8. Initially, the opposite marginal edges of these strips simultaneously contact the bar 8. Thereafter, continued increase of the contact pressure simultaneously effects two functions. Firstly, the dextrorsal and sinistrorsal legs 21 and 22 are twisted with the strips 23 and 24 being moved toward but short of parallelism with the bar 8. This unwinding or untwisting movement of the legs tends to slide the strips 23 and 24 along the surface of the bar 8 as indicated by the two arrows 25 in Fig. 4. Thus, the surface of the bar 8 is scraped and wiped by the strips 23 and 24 to scour dirt and oxides therefrom. Additionally, it will be noted that the scraping or wiping action of the two strips is effected in opposite directions simultaneously. In accord with one important feature of my invention, this simultaneous yet opposite movement balances out the forces acting upon the switch blade and contact bar so that undue stress and strain will not be imparted thereto, it being recalled that the blade and contact elements both are very small and delicate in actual use.

The second resultant function of the increase in closure pressure results in a bowing of the legs 21 and 22 as shown in Fig. 4. This flexing or bowing of the legs tends to draw the strips 23 and 24 across the contact bar 8 in the direction indicated by the arrows 26 of Fig. 4. In actual practice, both this crosswise scraping and wiping of the strips and contact bar and the similar endwise cleaning of these elements are effected simultaneously.

As will be appreciated by those skilled in the art, the current generated by the photovoltaic cell 5 is too weak to move the coil 16 against the opposition of any appreciable force. For this reason, the switch blade 7 should be made as light and as sensitive as possible. At the same time, a camera exposure control mechanism which is utilized in conjunction either with a motion picture camera or a television camera constantly is effecting an adjustment as the light level varies. This constant change in the camera control mechanism, of course, requires that the switch mechanism 7, 8, 9 be actuated to make and break the electric circuit many times during each photographic sequence. Seemingly, the requirement for sensitivity and lightness of construction are incompatible with the rugged strength required to effect such a multiplicity of actuations over a long period. However, the novel electric switch of the instant invention will serve these purposes. One reason that an effective closure of the switch is made with assurance each time is that two legs 21 and 22 are provided instead of but one leg. Thus, if a small piece of dust or dirt inadvertently should catch beneath one of the strips 23 or 24, the other strip still will make contact. At the same time, the novel endwise and crosswise simultaneous scraping of the strips upon the contact bar cleans and scours an electrically conductive surface of the most efficient type. Still further, the flexible construction of the switch blade 7 cushions the closure of the switch and, additionally, aids in effecting an opening movement of the switch in function similar to a spring. That is to say, the electric switch of this invention is opened by moving one of the contact bars away from the switch blade. This movement is aided by the spring-like flexibility of the legs 21 and 22 and by the tendency of these legs to resume their twisted initial positions.

In summary, it will be seen that I have provided a small, self-cleaning electric switch of unusual sensitivity and operating efficiency, said switch being responsive to extremely light actuation pressures selectively to make or to break an electric circuit which is joined in series therewith. Additionally, I have provided a switch blade which is twisted and flexible whereby closure pressure of the blade against a stiff contact bar simultaneously will slide the blade along the contact and will draw the blade across the contact. In this manner, the contact bar is scraped and scoured to remove dirt and oxides each time the switch is closed. In the operation of an automatic camera exposure control, such as that disclosed in my previously mentioned copending application, this electric switch is of prime and critical importance.

I claim:

1. A switch device, comprising a switch blade carried by a rotatable coil means for movement therewith, a pair of elongated parallel contact bars arranged one on either side of said switch blade for cooperation and selective contact therewith, said switch blade including a flat thin laterally extending strip, said strip being flexible and being twisted about the longitudinal axis thereof whereby contact pressure against either of the bars simultaneously will untwist and slide the strip along the surface of the contact bar.

2. In combination, a rotatable switch blade, a pair of contact bars arranged for cooperation and selective contact with said switch blade, said switch blade including an elongated leg terminating in a thin strip which is arranged at an oblique angle to said contact bars, said leg and strip both being flexible and said contact bars being stiff whereby abutment of the strip with one of the bars will twist the strip and slide it along the bar while, at the same time, bowing the flexible leg to draw the strip laterally across the bar.

3. An electric switch, comprising mated blade and contact means defining the relatively moveable elements of a switch, said blade means including a pair of oppositely twisted and laterally extending contact strips, said contact means including a bar arranged immediately adjacent said strips with the strips lying obliquely to the bar so that one marginal edge of each strip is closely adjacent the bar and the opposite marginal edge thereof is spaced from the bar, initial contact between said strips and said bar being effected simultaneously by one marginal edge of each strip.

4. In a self-cleaning electric switch, mated but normally spaced blade and contact means selectively movable into direct abutment one with another to close the switch, said blade means including a pair of elongated thin legs mounted with the axes thereof parallel, said legs respectively being dextrorsal and sinistrorsal and both terminating in thin laterally extending strips which are arranged perpendicular to the respective axes of the legs, said contact means including a laterally elongated bar arranged immediately adjacent said strips and perpendicular to the axes of said legs, said strips being arranged at opposite oblique angles to said bar, said legs and strips being flexible and said bar being stiff whereby contact pressure between these elements will bow the legs to draw the strips laterally across the bar.

5. In a self-cleaning electric switch, mated but normally spaced blade and contact means selectively movable into direct abutment one with another to close the switch or separable one from another to open the switch, said blade means including a pair of elongated legs mounted with the axes thereof parallel and each having a thickness of less than $1/1000$ of an inch, said legs respectively being dextrorsal and sinistrorsal and both terminating in thin laterally extending strips which are arranged perpendicular to the respective axes of the legs, said contact means including a laterally elongated bar arranged immediately adjacent said strips and perpendicular to the axes of said legs, said strips being arranged at opposite oblique angles to said bar with one marginal edge of each strip closely adjacent the bar and the opposite marginal edge thereof spaced from the bar, initial contact between said strips and said bar being effected simultaneously by one marginal edge of each strip, said legs and strips being flexible and said bar being stiff whereby increased contact pressure will twist the strips toward parallelism with the bar and will bow the legs to draw the strips laterally across the bar.

6. In a self-cleaning electric switch, mated blade and contact means selectively movable to close or to open the switch, said blade means including a thin U-shaped sheet having elongated legs which are joined by a connecting section, said blade legs being dextrorsal and sinistrorsal respectively and both terminating in laterally extending flat strips, said contact means including a laterally elongated bar arranged parallel to said connecting section and immediately adjacent said two flat strips, the closure of said switch being effected by the simultaneous abutment of said flat strips with said bar.

7. In a self-cleaning electric switch, mated but normally spaced blade and contact means selectively movable into direct abutment one with another to close the switch or separable one from another to open the switch, said blade means including a thin U-shaped sheet of platinum metal having a low electrical resistance and formed with two elongated legs which are joined by a connecting section, said blade legs being dextrorsal and sinistrorsal respectively and both terminating in laterally extending flat strips which are spaced laterally one from another to define companion T-shapes, said legs and strips having a thickness of less than $1/1000$ of an inch, said contact means including a laterally elongated bar arranged parallel to said connecting section and immediately adjacent said two flat strips, the closure of said switch being effected by the simultaneous abutment of said flat strips with said bar, said blade means being flexible and said contact means being stiff so that abutment of said strips and bar twists the dextrorsal and sinistrorsal blade legs in an unwinding direction while, at the same time, bowing the legs to draw the strips across the bar.

References Cited in the file of this patent

UNITED STATES PATENTS

| | | |
|---|---|---|
| 287,511 | Edison | Oct. 30, 1883 |
| 814,501 | Allen | Mar. 6, 1906 |
| 886,138 | Lansinger | Apr. 28, 1908 |
| 2,525,408 | Graybill et al. | Oct. 10, 1950 |

FOREIGN PATENTS

| | | |
|---|---|---|
| 112,544 | Great Britain | Jan. 17, 1918 |